United States Patent
Lockwood

(10) Patent No.: US 10,001,572 B2
(45) Date of Patent: Jun. 19, 2018

(54) MAGNETO-HYDRODYNAMIC SEISMIC SOURCE AND A METHOD OF MARINE SEISMIC SURVEYING

(71) Applicant: Woodside Energy Technologies Pty Ltd., Perth (AU)

(72) Inventor: Andrew Maxwell Lockwood, Bateman (AU)

(73) Assignee: WOODSIDE ENERGY TECHNOLOGIES PTY LTD., Perth Wa (AU)

(*) Notice: Subject to any disclaimer, the term of this patent is extended or adjusted under 35 U.S.C. 154(b) by 266 days.

(21) Appl. No.: 14/873,286

(22) Filed: Oct. 2, 2015

(65) Prior Publication Data

US 2016/0077227 A1    Mar. 17, 2016

Related U.S. Application Data

(63) Continuation of application No. PCT/AU2014/000365, filed on Apr. 4, 2014.

(30) Foreign Application Priority Data

Apr. 5, 2013 (AU) ............... 2013901181

(51) Int. Cl.
  *G01V 1/00* (2006.01)
  *G01V 1/133* (2006.01)
  (Continued)

(52) U.S. Cl.
  CPC ............ *G01V 1/133* (2013.01); *G01V 1/02* (2013.01); *G01V 1/04* (2013.01); *G01V 1/137* (2013.01);
  (Continued)

(58) Field of Classification Search
  CPC .................... H02K 44/08; E21B 41/0085
  See application file for complete search history.

(56) References Cited

U.S. PATENT DOCUMENTS

| | | | | |
|---|---|---|---|---|
| 3,080,515 A | * | 3/1963 | Kehoe | H02K 44/08 310/11 |
| 3,155,850 A | * | 11/1964 | Meyer | H02K 44/08 310/11 |

(Continued)

FOREIGN PATENT DOCUMENTS

| | | |
|---|---|---|
| EP | 0573704 A1 | 12/1993 |
| SU | 744399 A1 | 6/1980 |

OTHER PUBLICATIONS

International Search Report in counterpart International Application No. PCT/AU2014/000365 (3 pages), dated Jun. 13, 2014.

(Continued)

*Primary Examiner* — Hovhannes Baghdasaryan
(74) *Attorney, Agent, or Firm* — Edell, Shapiro & Finnan, LLC

(57) ABSTRACT

A magneto-hydrodynamic seismic source includes a casing having a central longitudinal axis; a fluid flow channel, and a plurality of electromagnets arranged along the channel for generating a uniform magnetic field at right angles to the central longitudinal axis of the channel, a first electrode positioned on a first side of the fluid flow channel, the first electrode being positioned opposite a second electrode that is positioned on a second opposing side of the fluid flow channel, and a controllable power source in electrical communication with the first electrode and the second electrode for generating a continuously varying electric field between the first electrode and second electrodes to generate a continuously varying inflow of seawater into the first end of the fluid flow channel with a corresponding continuously (Continued)

varying outflow of seawater in the form of a seismic signal being produced from the second end of the fluid flow channel.

48 Claims, 11 Drawing Sheets

(51) Int. Cl.
  *G01V 1/04* (2006.01)
  *G01V 1/38* (2006.01)
  *G01V 1/02* (2006.01)
  *G01V 1/137* (2006.01)
(52) U.S. Cl.
  CPC .......... *G01V 1/3808* (2013.01); *G01V 1/3852* (2013.01); *G01V 1/38* (2013.01)

(56) References Cited

U.S. PATENT DOCUMENTS

| | | | |
|---|---|---|---|
| 3,161,789 A * | 12/1964 | Nagamatsu | H02K 44/08 310/11 |
| 3,345,523 A * | 10/1967 | Grunwald | H01F 7/202 310/11 |
| 3,349,367 A | 10/1967 | Wisotsky | |
| 3,409,852 A * | 11/1968 | Uhlmann | G21K 1/093 335/216 |
| 3,436,918 A * | 4/1969 | Powers, Jr. | H02K 44/08 219/121.11 |
| 3,863,202 A | 1/1975 | Landrum, Jr. | |
| 4,635,747 A | 1/1987 | Bird, Sr. et al. | |
| 4,754,601 A * | 7/1988 | Minovitch | B64G 1/402 244/171.1 |
| 4,918,668 A | 4/1990 | Sallas | |
| 5,003,517 A | 3/1991 | Greer, Jr. | |
| 8,102,731 B2 | 1/2012 | Cambois | |
| 2003/0214580 A1 | 11/2003 | Iddan | |

OTHER PUBLICATIONS

Velikhov, Ye P. et al., "Interpretation of MHD-sounding data from the Kola Peninsula by the electromagnetic migration method." Physics of the earth and planetary interiors 45.2 (1987): 149-160.
Supplementary European Search Report for EP14779007, dated Dec. 8, 2016, 8 pages.

* cited by examiner

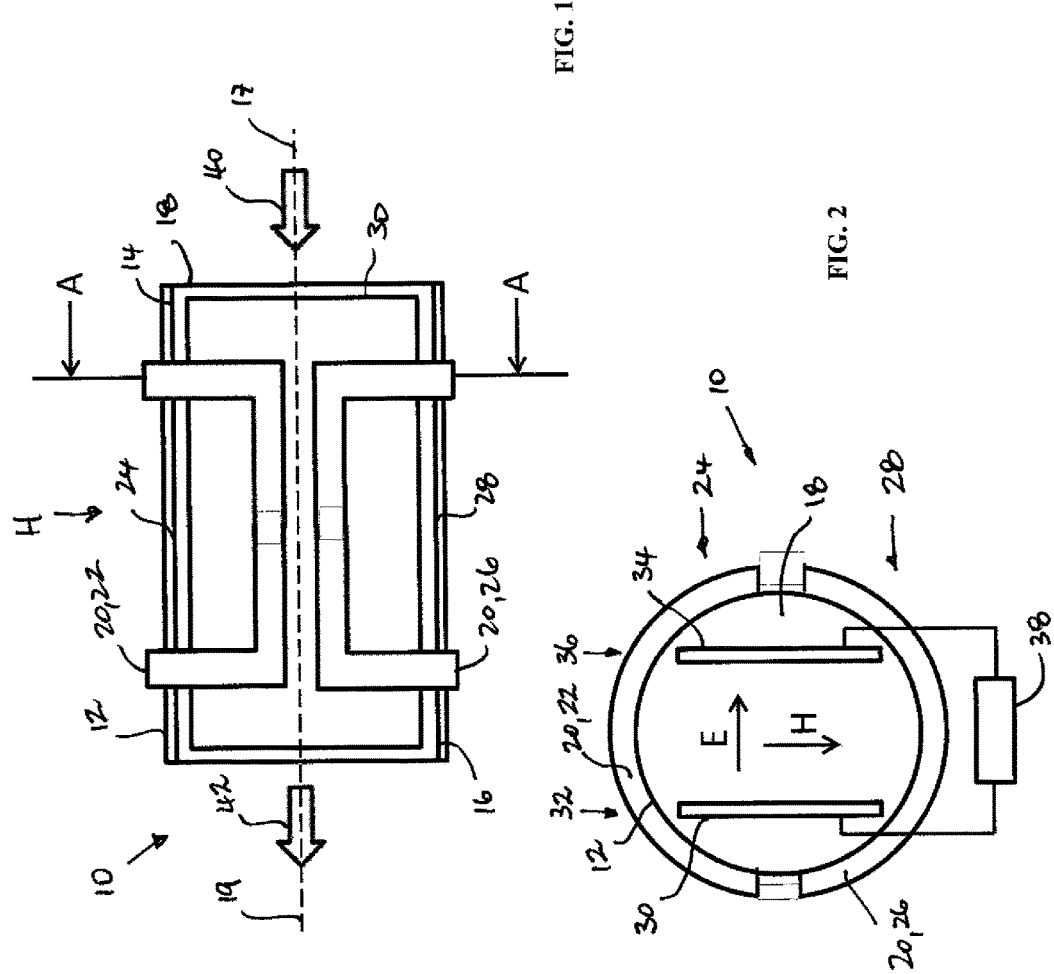

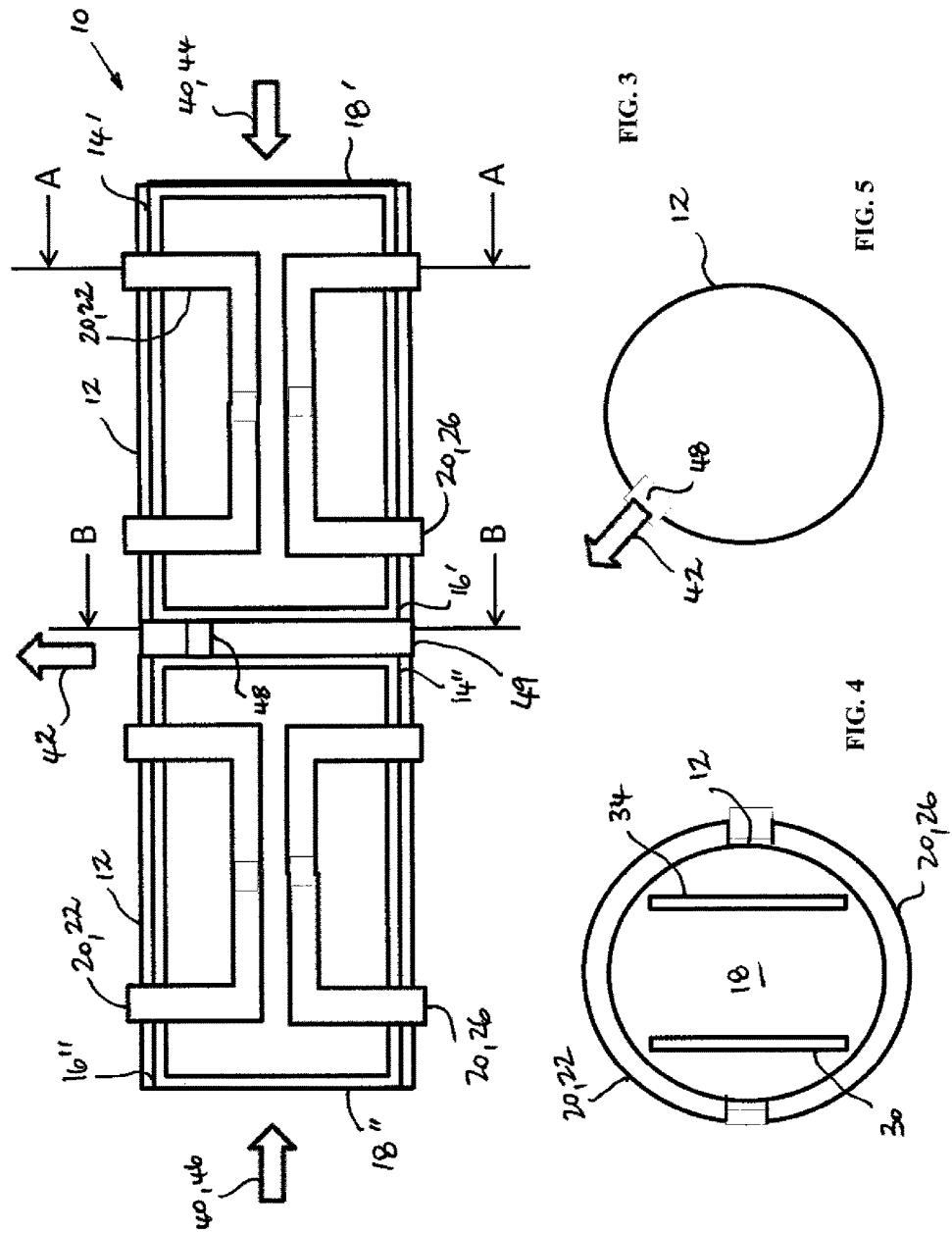

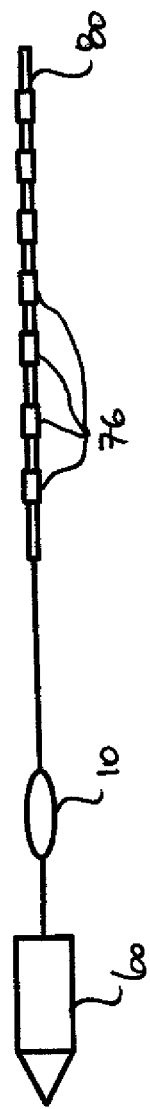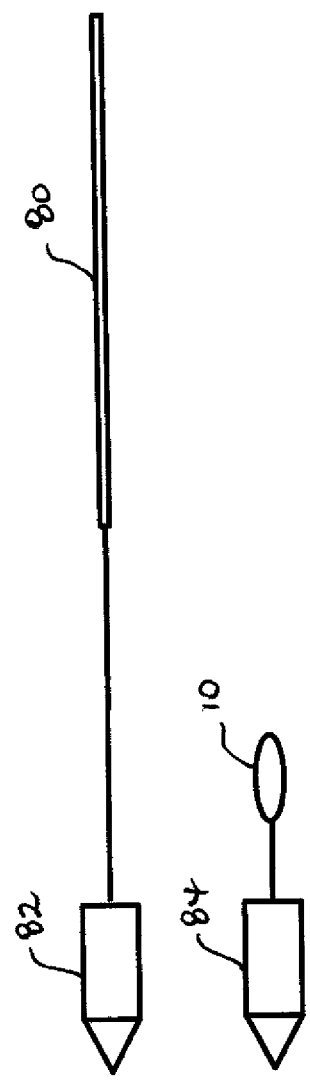
FIG. 9
FIG. 10

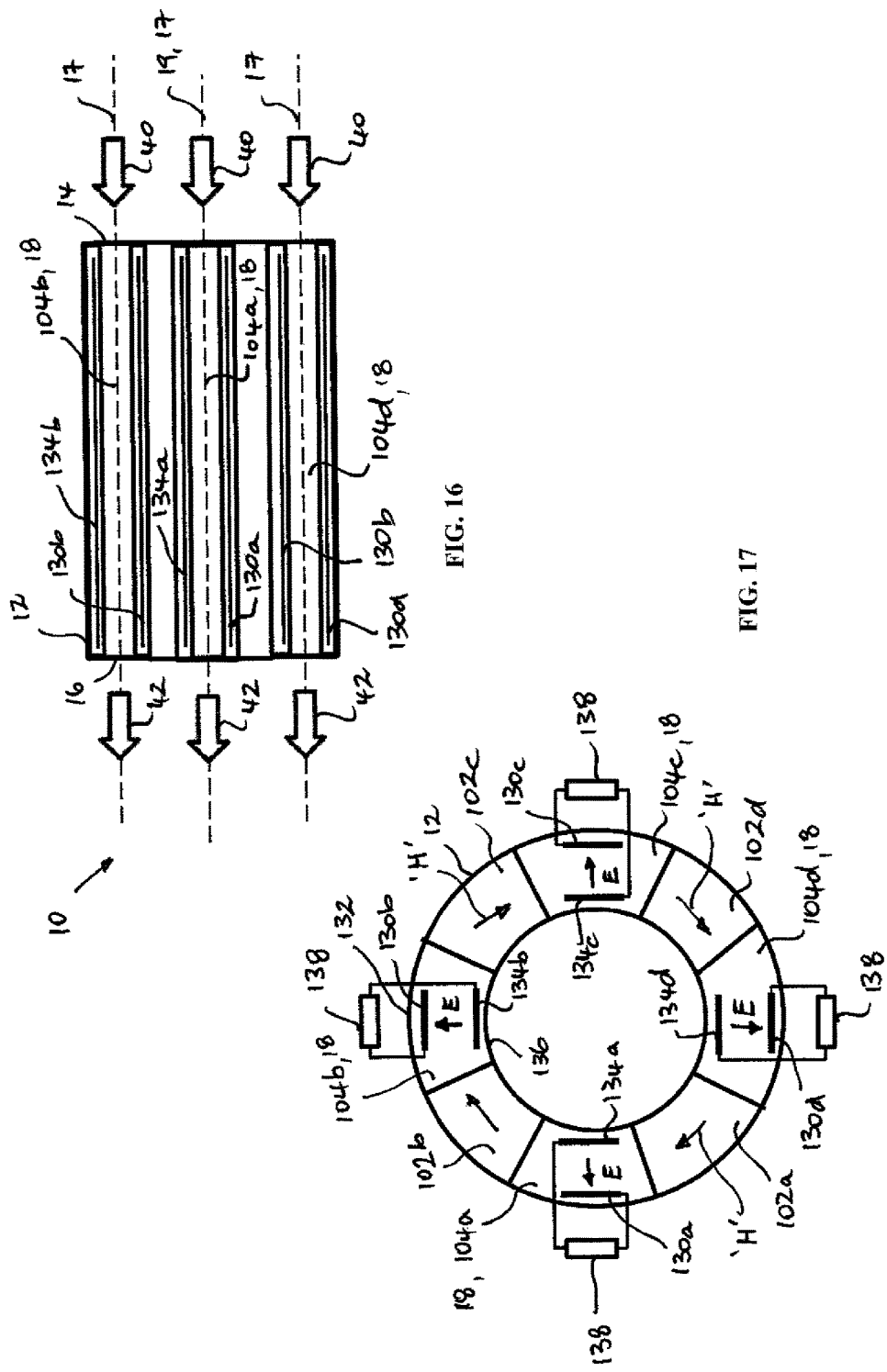

MAGNETO-HYDRODYNAMIC SEISMIC SOURCE AND A METHOD OF MARINE SEISMIC SURVEYING

FIELD

The invention relates generally to the field of marine seismic surveying. More particularly, the invention relates to magneto-hydrodynamic seismic energy sources used in such surveying.

BACKGROUND

Seismic surveying is used to map the geology of formations in a survey area by way of detecting the elastic properties of different geological features. Marine seismic exploration investigates and maps the structure and character of subsurface geological formations underlying a body of water. Marine seismic surveying typically uses a marine survey vessel to tow a seismic source through a body of water over the survey area whilst actuating the seismic source at selected intervals of time. Making a marine seismic survey of the structure and character of a subsea geological formation relies on intermittently activating the seismic source to generate seismic waves which travel through the body of water and the seabed before being refracted through the earth or reflected at interfaces associated with geological features within the subsea geological formation. The various seismic signals are received by a plurality of seismic signal receivers or sensors and recorded for further analysis. In a marine environment, one or more streamer cables may be towed by the survey vessel or by another vessel over the survey area, each streamer cable comprising a plurality of seismic signal receivers arranged at spaced apart locations along the length of the streamer cable. Alternatively or additionally, the seismic signal receivers may be arranged on the sea bed and the seismic source may be towed behind a separate vessel There are two types of seismic sources in use at this time. The first type is an 'impulsive' seismic source which is 'shot' at intermittent time intervals to produce 'pressure waves' or 'P-waves'. Examples of an impulsive seismic source are explosive devices such as 'air guns', 'gas guns' or 'sleeve exploders' or implosive devices. When an airgun is shot, it discharges air under very high pressure into the water. The discharged air forms a bubble which oscillates at a given frequency which is a function of the size of the airgun and how far below the surface of the water the airgun is located at the time that it is fired. This air bubble generates a pressure wave that expands outwards into a large volume until it interacts with a geological feature and generates a reflected seismic signal. One problem with the use of air guns is the interaction of the pulse of air with the surface of the water which creates a reflected 'ghost signal' that interferes with the reflected seismic signals from the geological features of interest that are being surveyed. The seismic signal generated by impulsive seismic sources has a waveform that cannot be precisely controlled and is either on or off.

Due to the physical limitations associated with generating and collapsing a bubble of air in seawater, another problem with the use of conventional impulsive seismic sources is that airguns only generate significant energy above around 5 Hz. One of the limiting factors for air guns (and water guns) with respect to a lowest practical output frequency is the size of the chamber used to store the pressurized gas, air or water. The low frequency energy is further reduced by the destructive interference of the ghost signal reflected from the surface of the water. Consequently, conventional airguns are only capable of generating a seismic signal having bandwidth in the range of 10 to 250 Hz. Attempts have been made to overcome this inherent problem of not being able to generate low frequency seismic signals using airguns by making them bigger or towing them at lower depths below the surface of the water. However, the pressure on the air bubbles generated when conventional airguns are towed more deeply under the water is increased making it more difficult to generate a large air bubble of lower frequency, with the result that the capacity of the air guns must also be increased to generate a signal of equivalent size. Attempts have also been made to operate multiple air guns of different sizes in an attempt to cancel out unwanted ghost signals. Despite these attempts, a particular limitation to impulsive seismic sources known in the art is that they are not capable of generating low frequency seismic energy, typically less than about 5 Hz.

The second type of seismic source is a marine vibrator that generates a waveform that can be controlled (see, for example, U.S. Pat. No. 3,863,202, U.S. Pat. No. 3,349,367, U.S. Pat. No. 4,635,747, U.S. Pat. No. 4,918,668, and U.S. Pat. No. 8,102,731). Marine vibrators typically include a pneumatic or hydraulic actuator which causes an acoustic piston to vibrate at a selected frequency. The vibrations of the acoustic vibrator produce pressure differentials in the water which generate seismic pulses free from spurious bubbles. Vibrator-type seismic energy sources are programmed through control signals to generate energy in the seismic frequency bandwidth of between 10 and 190 Hz. At these frequencies, the reactive mass or diaphragm must be relatively large, and the amount of motion that must be imparted to the radiating surface is also relatively large. Controlling such motion so that it faithfully corresponds to the electrical control signal has proven to be difficult. Thus, one of the limiting factors of a seismic energy source such as a marine vibrator is the power required to move the driving element at low frequencies and to maintain a reasonably pure tone, because hydraulically driven devices in the vibrator may have difficulty shifting the required fluid volume for such low frequencies. Consequently, a particular limitation to vibrator seismic sources known in the art is that they are not capable of generating low frequency seismic energy, typically less than about 10 Hz.

Whilst it is relatively easy to detect a geological interface where there are very sudden changes in the geological properties of the earth using conventional mid to high frequency seismic sources, it is only possible to detect gradual changes between the various layers in a formation at low frequencies. This limited range of bandwidths available with conventional seismic sources has the result that information regarding gradual changes in the geological features cannot be captured. When seismic survey data is collected, it is subjected to processing to attempt to recreate all the physical properties of the earth that relate to the propagation of seismic waves. One of the modelling techniques used during processing is called 'Full Waveform Inversion'. Because it is not possible to measure low frequency information below 5 Hz using conventional seismic sources, the seismic data that is acquired using conventional seismic sources is subjected to months of processing to estimate such parameters as the velocity and density to allow Full Waveform Inversion to commence. In the absence of low-frequency observed data below 5 Hz, full wave form inversion algorithms will not converge on the correct earth model due to the problem of local minima. Current approaches use conventional velocity tomography to create a 'starting model' for Full Waveform Inversion containing low-frequency information not measured in the survey. This approach has several major shortcomings. It requires a full seismic processing and imaging workflow to be applied before the tomography step can be conducted. This is time consuming and expensive. The result is a model with features in the range of 0 to 2 Hz. However, tomography still cannot resolve features in the range of 2 to 5 Hz which means that the result is a poor starting model for Full Waveform Inversion and the local minima problem is not satisfactorily addressed.

There remains a need in the art for an alternative marine seismic data source capable of supplying the lower frequencies required to more accurately characterise subsea geological features.

SUMMARY

According to a first aspect of the present invention there is provided a magneto-hydrodynamic seismic source comprising:
    a casing having a central longitudinal axis;
    a fluid flow channel having a first end and a second end and a longitudinal axis extending from the first end of the fluid flow channel to the second end of the fluid flow channel;
    a plurality of electromagnets arranged along the channel for generating a uniform magnetic field at right angles to the central longitudinal axis of the channel;
    a first electrode positioned on a first side of the fluid flow channel, the first electrode being positioned opposite a second electrode that is positioned on a second opposing side of the fluid flow channel; and,
    a controllable power source in electrical communication with the first electrode and the second electrode for generating a continuously varying electric field between the first electrode and second electrodes to generate a continuously varying inflow of seawater into the first end of the fluid flow channel with a corresponding continuously varying outflow of seawater in the form of a seismic signal being produced from the second end of the fluid flow channel.

In one form, the seismic signal has a frequency less than 5 Hz.

In one form, the plurality of electromagnets includes a first electromagnet arranged along a first side of the channel and a second paired electromagnet arranged on a second opposing side of the channel, and, each of the plurality of electromagnets is a saddle-type electromagnet. In one form, the each of the plurality of electromagnets is a superconducting electromagnet.

In one form, the each superconducting electromagnets has a polarity and the polarities of the plurality of superconducting magnets arranged along the casing are paired and opposed such that a first inflow of seawater enters at the first end of the fluid flow channel, and a second inflow of water enters at the second end of the fluid flow channel, wherein the fluid flow channel includes a discharge port for producing an outflow of seawater in the form of a seismic signal and the discharge port is positioned a discharge location intermediate between the first end of the fluid flow channel and the second end of the fluid flow channel.

In one form, the discharge location is centrally located between the first end of the fluid flow channel and second end of the fluid flow channel. In one form, the discharge port takes the form of a plurality of spaced apart apertures such that the outflow of seawater is directed radially outwardly from the fluid flow channel. In one form, the casing has a central longitudinal axis and the longitudinal axis of the fluid flow channel is parallel to or coaxial with the central longitudinal axis of the casing.

In one form, the seismic signal has a broadband waveform. In one form, the signal has a variable waveform. In one form, the seismic signal has a waveform in the form of a spike, a narrow band signal, a coded wave form, or a monochromatic waveform.

In one form, the magneto-hydrodynamic seismic source is one of a plurality of seismic sources arranged in an array. In one form, the array is a phased array. In one form, at least one of the seismic sources in the array is a magneto-hydrodynamic seismic source and at least one of the seismic sources in the array is an impulsive source. In one form, at least one of the seismic sources in the array is a magneto-hydrodynamic seismic source and at least one of the seismic sources in the array is a marine vibration seismic source.

In one form, the fluid flow channel is one of a plurality of fluid flow channels, each fluid flow channel having a first end and a second end and a set of first and second electrodes. In one form, the casing has a central longitudinal axis and the longitudinal axis of each fluid flow channel is parallel to and radially offset from a central longitudinal axis of the casing so that the plurality of flow fluid channels is evenly spaced around the circumference of the casing. In one form, the plurality of electromagnets is provided in the form of a plurality of electromagnet segments.

In one form, there is a corresponding number of the plurality of fluid flow channels and the plurality of electromagnet segments. In one form, the plurality of electromagnet segments is a plurality of toroidal or solenoidal magnet segments, arranged around the circumference of the casing In one form, the casing is cylindrical and has a circumference, and, the plurality of fluid flow channels is arranged at radially evenly spaced intervals around the outside of the circumference of the casing.

In one form, the plurality of fluid flow channels comprises a first subset of fluid flow channels and second subset of flow fluid channels and the power source is configured so that the direction of the inflow into the first subset of fluid flow channels is reversed relative to the direction of the inflow of seawater into the second subset of fluid flow channels.

In one form, the electrical field being generated across each set of first and second electrodes is tuned to adjust the inflow and outflow of seawater through each of the plurality of channels to counteract an overall drag force experienced by the magneto-hydrodynamic source when towed behind a marine vessel in use.

In one form, the electrical field being generated across each set of first and second electrodes is tuned to adjust the inflow and outflow of seawater through each of the plurality of channels so that the magneto-hydrodynamic source can be self-propelling.

In one form, the power source is one of a plurality of power sources.

According to a second aspect of the present invention there is provided a method of acquiring marine seismic data comprising:
    actuating a magneto-hydrodynamic seismic source to generate a seismic signal, a portion of said seismic signal being reflected at an interface associated with a subsea geological feature in the form of a reflected seismic signal; and,
    collecting the reflected seismic signal with a seismic signal receiver to generate a set of survey data, wherein the magneto-hydrodynamic seismic source comprises:
a casing having a central longitudinal axis;
a fluid flow channel having a first end and a second end and a longitudinal axis extending from the first end of the fluid flow channel to the second end of the fluid flow channel;
a plurality of electromagnets arranged along the channel for generating a uniform magnetic field at right angles to the central longitudinal axis of the channel;
a first electrode positioned on a first side of the fluid flow channel, the first electrode being positioned opposite a second electrode that is positioned on a second opposing side of the fluid flow channel; and,
a controllable power source in electrical communication with the first electrode and the second electrode for generating a continuously varying electric field between the first electrode and second electrodes to generate a continuously varying inflow of seawater into the first end of the fluid flow channel with a corresponding continuously varying outflow of seawater in the form of a seismic signal being produced from the second end of the fluid flow channel.

In one form, the seismic signal has a frequency less than 5 Hz.

In one form, the plurality of electromagnets includes a first electromagnet arranged along a first side of the channel and a second paired electromagnet arranged on a second opposing side of the channel, and, each of the plurality of electromagnets is a saddle-type electromagnet.

In one form, the each of the plurality of electromagnets is a superconducting electromagnet.

In one form, the each superconducting electromagnets has a polarity and the polarities of the plurality of superconducting magnets arranged along the casing are paired and opposed such that a first inflow of seawater enters at the first end of the fluid flow channel, and a second inflow of water enters at the second end of the fluid flow channel, wherein the fluid flow channel includes a discharge port for producing an outflow of seawater in the form of a seismic signal and the discharge port is positioned a discharge location intermediate between the first end of the fluid flow channel and the second end of the fluid flow channel.

In one form, the discharge location is centrally located between the first end of the fluid flow channel and second end of the fluid flow channel. In one form, the discharge port takes the form of a plurality of spaced apart apertures such that the outflow of seawater is directed radially outwardly from the fluid flow channel. In one form, the casing has a central longitudinal axis and the longitudinal axis of the fluid flow channel is parallel to or coaxial with the central longitudinal axis of the casing.

In one form, the seismic signal has a broadband waveform. In one form, the signal has a variable waveform. In one form, the seismic signal has a waveform in the form of a spike, a narrow band signal, a coded wave form, or a monochromatic waveform.

In one form, the magneto-hydrodynamic seismic source is one of a plurality of seismic sources arranged in an array. In one form, the array is a phased array. In one form, at least one of the seismic sources in the array is a magneto-hydrodynamic seismic source and at least one of the seismic sources in the array is an impulsive source. In one form, at least one of the seismic sources in the array is a magneto-hydrodynamic seismic source and at least one of the seismic sources in the array is a marine vibration seismic source.

In one form, the fluid flow channel is one of a plurality of fluid flow channels, each fluid flow channel having a first end and a second end and a set of first and second electrodes.

In one form, the casing has a central longitudinal axis and the longitudinal axis of each fluid flow channel is parallel to and radially offset from a central longitudinal axis of the casing so that the plurality of flow fluid channels is evenly spaced around the circumference of the casing. In one form, the plurality of electromagnets is provided in the form of a plurality of electromagnet segments.

In one form, there is a corresponding number of the plurality of fluid flow channels and the plurality of electromagnet segments. In one form, the plurality of electromagnet segments is a plurality of toroidal or solenoidal magnet segments, arranged around the circumference of the casing In one form, the casing is cylindrical and has a circumference, and, the plurality of fluid flow channels is arranged at radially evenly spaced intervals around the outside of the circumference of the casing.

In one form, the plurality of fluid flow channels comprises a first subset of fluid flow channels and second subset of flow fluid channels and the power source is configured so that the direction of the inflow into the first subset of fluid flow channels is reversed relative to the direction of the inflow of seawater into the second subset of fluid flow channels.

In one form, the electrical field being generated across each set of first and second electrodes is tuned to adjust the inflow and outflow of seawater through each of the plurality of channels to counteract an overall drag force experienced by the magneto-hydrodynamic source when towed behind a marine vessel in use.

In one form, the electrical field being generated across each set of first and second electrodes is tuned to adjust the inflow and outflow of seawater through each of the plurality of channels so that the magneto-hydrodynamic source can be self-propelling.

In one form, the power source is one of a plurality of power sources.

BRIEF DESCRIPTION OF THE DRAWINGS

The manner in which the objectives of the invention and other desirable characteristics can be obtained is explained in the following description and attached figures in which:

FIG. 1 is a side view of a first embodiment of the magneto-hydrodynamic seismic source of the present invention;

FIG. 2 is a cross-section view of the magneto-hydrodynamic seismic source of FIG. 1 as viewed through cross-section A-A;

FIG. 3 is a side view of a second embodiment of the magneto-hydrodynamic seismic source of the present invention including a discharge port;

FIG. 4 is a cross-section view of the magneto-hydrodynamic seismic source of FIG. 3 as viewed through cross-section A-A;

FIG. 5 is a cross-section view of the magneto-hydrodynamic seismic source of FIG. 3 as viewed through cross-section B-B;

FIG. 9 illustrates a plurality of seismic signal receivers are arranged at selected intervals along a streamer that is being towed by the same marine survey vessel that is towing a magneto-hydrodynamic seismic source;

FIG. 10 illustrates a streamer towed by a first vessel with the magneto-hydrodynamic source being towed independently by a second vessel;

FIG. 16 illustrates a side cross-sectional view of an embodiment of the magneto-hydrodynamic source showing a corresponding number of fluid flow channels and a plurality of toroidal coil magnet segments evenly spaced apart around the circumference of the casing with the power supply controlled to cause the inflow of seawater in the same direction through each subset of the plurality of flow channels;

FIG. 17 illustrates an end cross-sectional view of the embodiment illustrated in FIG. 16;

DETAILED DESCRIPTION

Figure 6:
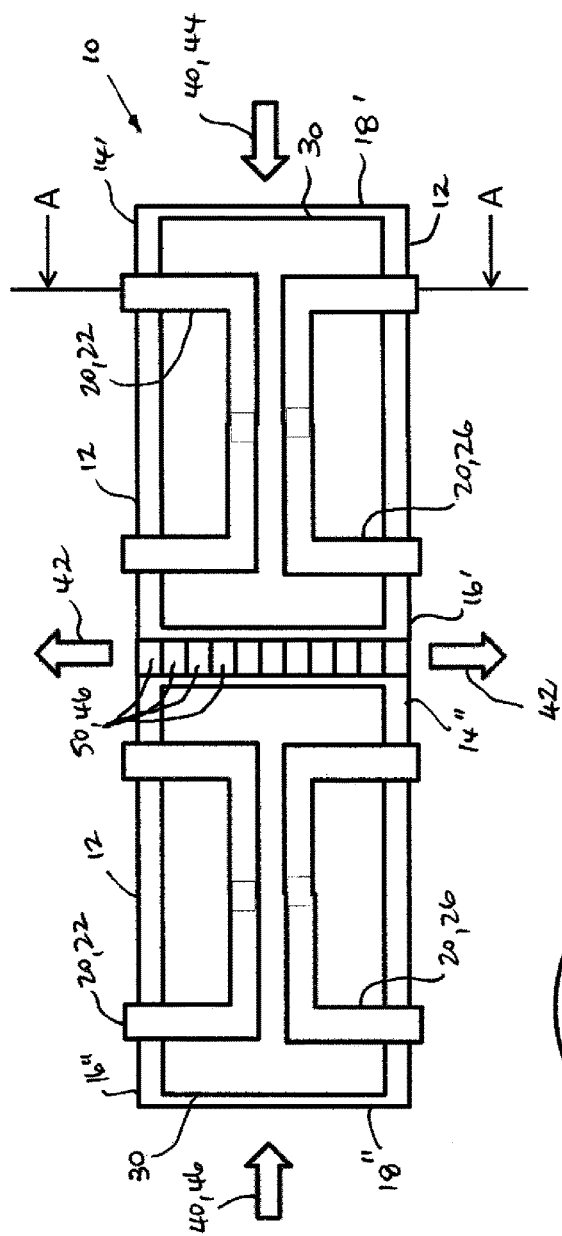
FIG. 6 is a side view of a third embodiment of the magneto-hydrodynamic seismic source of the present invention in which the discharge port comprising a plurality of apertures.

Particular embodiments of the present invention are now described. However, it will be understood by those skilled in the art that the present invention may be practiced without these details and that numerous variations or modifications from the described embodiments may be possible. The terminology used herein is for the purpose of describing particular embodiments only, and is not intended to limit the scope of the present invention. Unless defined otherwise, all technical and scientific terms used herein have the same meanings as commonly understood by one of ordinary skill in the art to which this invention belongs.

The term 'source ghost signal' is used to refer to the energy reflected at the interface between the surface of a body of water and the pressure wave emitted by a seismic source.

In broad terms, the magneto-hydrodynamic source of the present invention relies on an electrical field being applied transversely to a volume of seawater within a uniform, intense magnetic field. The resulting Lorenz force drives a flow of seawater at right angles to the electric and magnetic fields. The Lorenz force over a region of uniform electric and magnetic field can be calculated by the formula:

$$F = J \times B \times V,$$

where F is the force, J is the electric current density and B is the magnetic flux density in the volume V.

As the resulting force on the seawater is directly proportional to the applied electric field, the movement of the flow of seawater is able to be precisely controlled by varying the applied current supplied to the electrodes. The Lorentz force acting on the seawater is produced by the electric field applied at right angles to the magnetic field. The conductive seawater will move rapidly in the direction of the Lorentz force when the electric field is applied. With the magnetic field being held at a constant magnetic flux, the flow of water from the magneto-hydrodynamic source is a linear function of the applied electric field making it possible to generate a low frequency flow of seawater that overcomes the limitations of prior art impulsive and vibration sources. The movement of the flow of seawater generated using the 'magneto-hydrodynamic source' of the present invention creates a pressure wave suitable for marine seismic surveying. To generate a seismic signal, the applied electric field is continuously varied.

A first embodiment of the magneto-hydrodynamic seismic source of the present invention is now described with reference to FIG. 1 and FIG. 2. The magneto-hydrodynamic seismic source (10) includes a hollow, non-magnetic, electrically-insulated casing (12). The source includes a fluid flow channel (18) having a first end (14) and a second end (16), the fluid flow channel having a longitudinal axis (19) extending from the first end of the fluid flow channel to the second end of the fluid flow channel. Preferably, the casing (12) has a central longitudinal axis (17) and the longitudinal axis (19) of the fluid flow channel (18) is parallel to or co-axial with the central longitudinal axis (17) of the casing (12). A plurality of electromagnets (20) is arranged along the longitudinal axis of the fluid flow channel (18) to generate a uniform magnetic field in the direction generally designated by the arrow labelled with the reference label 'H' in FIGS. 1 and 2. As can be seen from FIG. 2, the induced magnetic field is at right angles to the fluid flow channel (18) and the casing (12). In the embodiment illustrated in FIG. 1 and FIG. 2, the plurality of superconducting magnets comprises a first saddle-type superconducting electromagnet (22) arranged along a first side (24) of the channel and a second paired saddle-type superconducting electromagnet (26) arranged on a second opposing side (28) of the channel creating a uniform induced magnetic field at right angles to the bore of the casing.

It is to be understood that the present invention is not limited to the use of a pair of electromagnets. Any number of electromagnets may be included in the plurality of electromagnets provided only that a uniform magnetic field is induced at right angles to the bore of the casing. Superconducting electromagnets are the preferred kind of electromagnets for the magneto-hydrodynamic seismic source of the present invention because once a superconductor magnet is powered up, they are capable of retaining a uniform intense magnetic field for an extended period of time. This time can be maximised by circulating a coolant such as liquid nitrogen through the superconducting electromagnets to improve performance. Other kinds of electromagnets other than superconducting electromagnets, for example, toroidal or solenoidal electromagnets, may be used. It is to be further understood that the fluid flow channel need not be cylindrical in cross-section, provided only that a flow of seawater can pass through the fluid flow channel from the first end to the second end.

In the embodiment illustrated in FIG. 1 and FIG. 2, a first electrode (30) is positioned within the fluid flow channel (18) on the first side (32) of the fluid flow channel (18), the first electrode being positioned opposite a second electrode (32) that is positioned within the casing on a second opposing side (36) of the fluid flow channel. Using this arrangement, the first and second electrodes (30 and 34, respectively) are positioned within the casing at right angles to the magnetic field (designated as 'H') induced by the plurality of electromagnets (20). In use, a power source (38) in electrical communication with the first and second electrodes is actuated to apply a continuously varying electrical current across the first and second electrodes to generate a controlled electric field extending from the first electrode (30) towards the second electrode (34) in the direction generally designated by the arrow labelled with the reference label 'E' in FIG. 2 which is at right angles to the magnetic field 'H'. The interaction of the fixed magnetic field and the continuously varying electrical field generates the Lorenz force that acts on the conductive seawater present within the fluid flow channel (18). Using the magneto-hydrodynamic source of the present invention, an inflow of seawater (40) is caused to enter the first end (14) of fluid flow channel (18) with a corresponding outflow of seawater (42) in the form of a seismic signal being produced from the second end (16) of the fluid flow channel (18). The Lorentz force applied to the inflow and outflow (40 and 42, respectively) varies in proportion to the continuously varying electrical field generated across the first and second electrodes by the power supply. If the power source (38) is actuated to apply a constant electrical current across the first and second electrodes, the inflow and outflow (40 and 42, respectively) would also be constant, with the result that the outflow of seawater (42) would not be suitable for use in generating a seismic signal.

By way of example only, assuming that the casing is one meter long and the internal diameter of the bore of the casing is 0.25 meters, with a uniform magnetic field inside the bore of the casing of 5 Telsa, and an applied current of 2000 A, the Lorentz force acting on the seawater inside the chamber will be 2500 N. Assuming no frictional losses and assuming a seawater density of 1000 kg/m$^3$ and no interference with the ocean as the magneto-hydrodynamic source is towed through it, a flow of 2.5 m$^3$/s of seawater will be produced from the fluid flow channel under steady conditions. To create a sufficient signal for marine seismic surveys, it is estimated that a flow rate of 3 m$^3$/s is required to for frequencies below 2 Hz. This is achieved using the simplified example given above by increasing the current applied to the electrodes.

A second embodiment of the present invention is illustrated in FIGS. 3, 4 and 5 for which like reference numerals refer to like parts. In this embodiment, the seismic signal associated with the outflow (42) of seawater is generated using a pair of the magneto-hydrodynamic seismic sources of the first embodiment arranged end to end. Using this arrangement, the pair of magneto-hydrodynamic sources are housed within a common casing (12) such that the fluid flow channels of each source are arranged end to end. The polarities of the plurality of superconducting electromagnets (20) arranged along the casing (12) are paired and opposed such that a first inflow of seawater (44) enters at the first end (14') of a first fluid flow channel (18') and a second inflow of water (46) enters at the second end (16") of a second fluid flow channel (18"). In this embodiment, the casing includes a discharge port (48) for producing an outflow of seawater (42) in the form of a seismic signal. In this embodiment, the single discharge port (48) directs the outlet flow of sea water radially outwardly from the casing (12) at a predetermined angle (generally designated by the arrow labelled with the reference numeral 42 in FIG. 5) to control the direction of propagation of the seismic signal. The discharge port is positioned a discharge location (49) intermediate between the first end (14') of the first fluid flow channel (18') and the second end (16") of the second fluid flow channel (18"). To maximise the stability of the magneto-hydrodynamic source, the discharge location is centrally located between the first end of the first fluid flow channel and second end of the second fluid flow channel in the embodiment illustrated in FIG. 3 but this is not essential to the working of this embodiment of the present invention.

Figure 7:
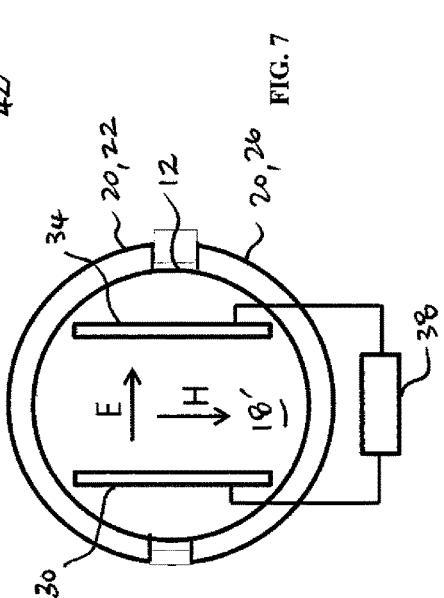
FIG. 7 is a cross-section view of the magneto-hydrodynamic seismic source of FIG. 6 as viewed through cross-section A-A.

In a third embodiment illustrated in FIGS. 6 and 7, the discharge port (46) takes the form of a plurality of spaced apart apertures (50) such that the outflow of seawater (42) is directed radially outwardly from the casing (12). The second and third embodiments illustrated in FIGS. 3 to 7 effectively double rate of the outflow of seawater (42) generated using the magneto-hydrodynamic seismic source compared with the first embodiment illustrated in FIG. 1.

The precision with which the power supply applies a continuously varying electric current across the first and second electrodes of the magneto-hydrodynamic seismic source is able to be controlled is far higher for the magneto-hydrodynamic source of the present invention, than the mechanical switching and movement involved in opening an airgun. Impulsive seismic sources such as an airgun operate while underwater by opening a set of valves to a chamber containing air under pressure. When an airgun is discharged, there is a period required to recharge the chamber with compressed air, which limits the operating time available to discharge the next shot. When the valves are open, the pressure supplied to the water peaks initially and decays as the air supply is exhausted. In contrast, the magneto-hydrodynamic seismic source of the present invention can operate continuously as there is no need for recharge, and the flow rate can be varied during each transmission event by changing the current supplied to the electrodes. As there is no requirement to provide a compressed air supply to the magneto-hydrodynamic seismic source of the present invention, the magneto-hydrodynamic seismic source is more portable and adapted for use in other situations where an air gun is used, such as vertical seismic profiling on drilling rigs, or using a vessel of opportunity to operate a source array independently of a hydrophone or geophone array.

As set out above in the 'Background to the Invention', conventional seismic sources used for marine seismic surveys have a limited bandwidth due to the finite volume of air that can be supplied for an individual pulse and the effect of increasing pressure if the source of the air is towed deeper below the surface of the water. As no bubble of air is used to move the water using the magneto-hydrodynamic seismic source of the present invention, the magneto-hydrodynamic seismic source overcomes the low frequency limitation of prior art devices. Advantageously, the magneto-hydrodynamic seismic source is able to continuously generate a flow of water as long as power is supplied to the electrodes. As the magneto-hydrodynamic seismic source can vary continuously, the potential to use multiple sources in phased arrays to simultaneously illuminate subsea geological features exists. The ability to transmit a complex waveform enables an array of magneto-hydrodynamic seismic sources to reconstruct a variety of wavefields below the array. These can be optimised to illuminate selected regions of the subsurface by adjusting the waveforms of the outlet flows of seawater so that they arrive at a selected target location associated with a subsea geological feature in phase at a selected time.

One of the limitations of an airgun is caused by the interaction of the pressure wave generated by the airgun with the surface of the ocean. The energy travelling upward after the airgun discharges is reflected downward again from the surface of the water in the form of a ghost signal. This reflected, downward travelling ghost signal interferes with the rest of the pressure wave, and causes a loss of low frequency energy for prior art impulsive sources. Because the seismic signal generated by the magneto-hydrodynamic seismic source of the present invention is generated by moving an outflow pulse of seawater through seawater, the compressibility problems associated with the air bubbles generated by conventional air guns are avoided. The magneto-hydrodynamic seismic source of the present invention is able to transmit an arbitrary waveform which can be tuned to deliver a seismic signal with a waveform that interferes constructively with the ghost signal to eliminate its effects. By controlling the power supplied to the electrodes, the seismic signal generated by the magneto-hydrodynamic seismic source can have a magneto-hydrodynamic waveform in the form of a series of spikes an oscillating wave form, a sinusoidal wave form, a broadband signal, a narrow band signal, an array-based signal, a phased-array signal, a coded wave form (which is a random wave form generated according to a rule), or a monochromatic waveform. One of the main advantages of being able to generate broadband seismic signals using the magneto-hydrodynamic seismic source of the present invention is that noise becomes more random, making it easier to deal with.

Figure 8:
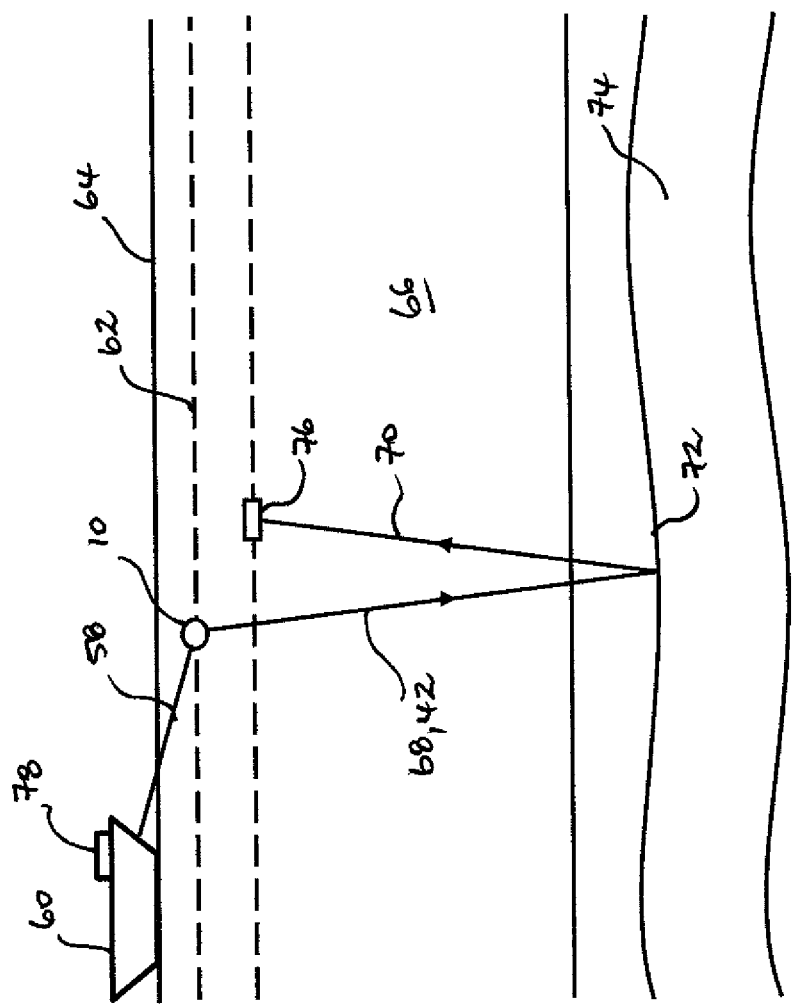
FIG. 8 is a schematic plan view representation of a marine seismic survey illustrating a seismic wave reflected at an interface of a subsea geological feature.

The use of the magneto-hydrodynamic seismic source of the present invention in the context of performing a method of conducting a marine seismic survey is now described with reference to FIG. 8. In this embodiment, a magneto-hydrodynamic seismic source (10) is towed by a first source cable (58) behind a marine survey vessel (60). The magneto-hydrodynamic seismic source (10) is deployed at a predetermined depth (62) below the surface (64) of a body of water (66). Power is supplied to the electrodes in a continuously varying controlled manner using the power supply (38) to cause an inflow of polarized seawater through the fluid flow channel (18). A broadband seismic signal (68) in the form of an outflow of water (42) is emitted by the magneto-hydrodynamic seismic source (10). The seismic signal (68) travels outwardly from the magneto-hydrodynamic seismic source (10) through the body of water (66). A reflected seismic signal (70) is generated when the seismic signal is reflected at an acoustic impedance boundary or 'interface' (72) associated with a subsea geological feature (74). The reflected seismic signal (70) travels upwardly through the body of the water (66) where it is detected by a plurality of seismic signal receivers (76), one of which is shown in FIG. 8 for clarity purposes only. The type of seismic signal receiver is not a limit on the scope of the present invention. Each seismic signal receivers (76) may be any known device used in the art of marine seismic surveying to detect seismic energy, including pressure or pressure time gradient responsive sensors, particle motion responsive sensors, or combinations thereof. Conventional seismic signal receivers known in the art as geophones, accelerometers or hydrophones may be used to receive the reflected signals. In an analogous manner, the type of streamer or subsea cable is not a limit on the scope of the present invention. Conventional streamers and subsea cables known in the art may be used to house the plurality of seismic signal receivers.

During a seismic survey, each reflected seismic signal (70) is measured at a seismic signal receiver (76) and the orientation and position of each seismic source relative to each seismic signal receiver is logged. A seismic data collection system (78) is used to record the reflected seismic signals (70) received by the plurality of seismic signal receivers (76), typically time indexed with respect to the actuation of the magneto-hydrodynamic seismic source (10). The seismic survey data collected by the data collection system for each seismic signal receiver is recorded and processed to provide information about the underlying subsurface geological feature. A plurality of reflected signals is gathered for a range of source/receiver pairs to provide a marine seismic survey data set. Signal processing is employed to provide further enhancement of the seismic reflections. Velocity filtering, and common-depth-point stacking are steps in the processing sequence which can be used to provide some additional improvement in the signal-to-noise ratio.

Figure 11:
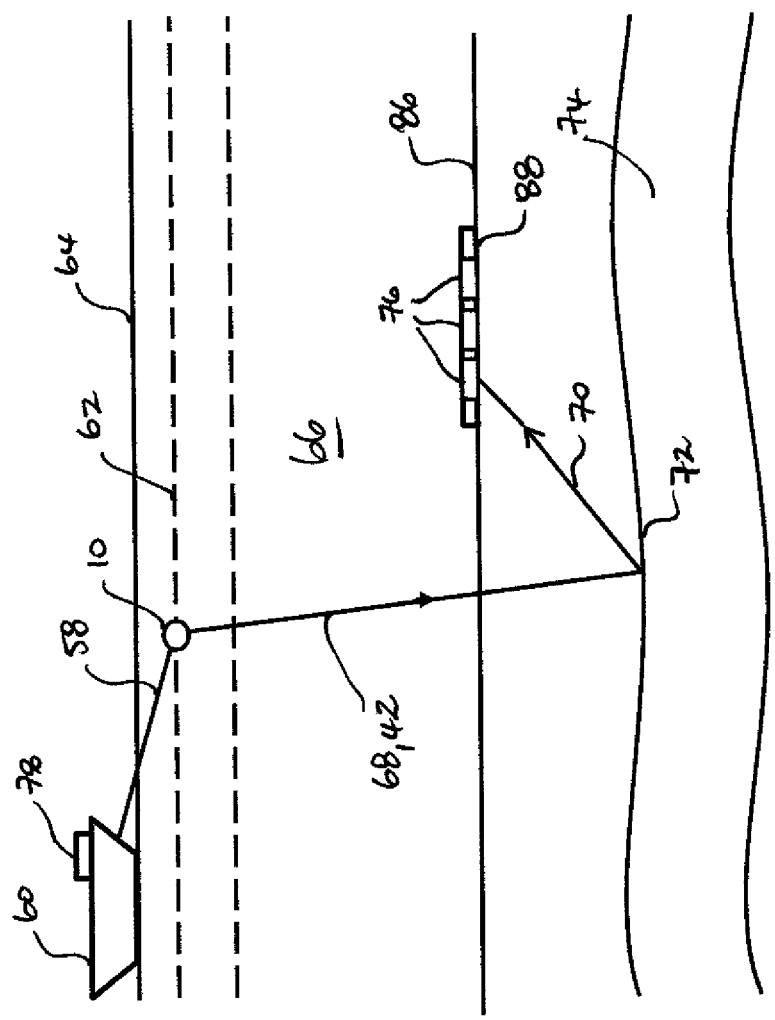
FIG. 11 is a schematic representation of FIG. 8 in which the plurality of seismic signal receivers is arranged at or on the seabed within one or more subsea cables.

With reference to FIG. 9, the plurality of seismic signal receivers (76) are arranged at selected intervals along a streamer (80) that is being towed by the same marine survey vessel (60) that is towing the seismic source (10). Alternatively, as illustrated in FIG. 10, the streamer (80) may be towed by a first vessel (82) with the magneto-hydrodynamic source (10) being towed independently by a second vessel (84). Alternatively or additionally, as shown in the embodiment illustrated in FIG. 11 the plurality of seismic signal receivers (76) may be arranged at or on the seabed (86), for example, within one or more subsea cables (88).

Figure 12:
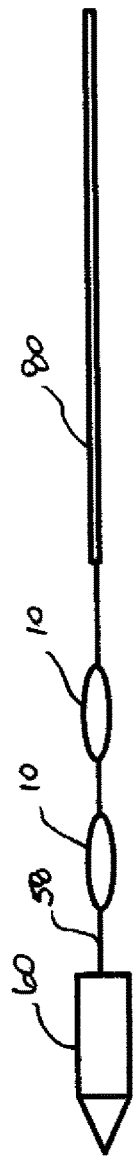
FIG. 12 illustrates a single marine survey vessel being used to tow a plurality of magneto-hydrodynamic seismic sources along with a single streamer.
Figure 13:
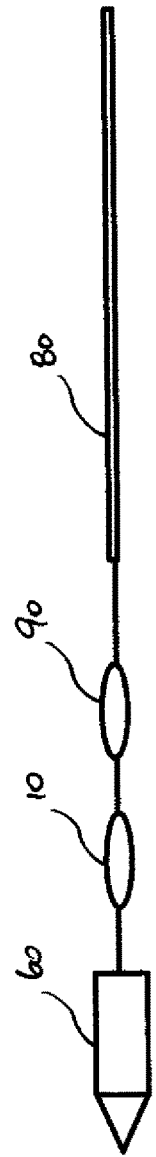
FIG. 13 illustrates a single marine survey vessel being used to tow a magneto-hydrodynamic seismic source and a second seismic source along with a single streamer.

One or more magneto-hydrodynamic seismic sources may be included as one of a plurality of marine seismic sources in an array or a phased array. In the embodiment illustrated in FIG. 12, a single marine survey vessel (60) is used to tow a plurality of magneto-hydrodynamic seismic sources (10), with two being illustrated, along with a single streamer (80), the plurality of magneto-hydrodynamic seismic sources travelling with the same vessel (60) that is used to tow the single streamer. In the embodiment illustrated in FIG. 13, a single marine survey vessel (60) is used to tow a magneto-hydrodynamic seismic source (10) and a second seismic source (90) along with a single streamer. In this embodiment, the second seismic source is an impulsive seismic source or a marine vibration seismic source. In this embodiment, the magneto-hydrodynamic seismic source (10) is being used to augment the signals generated by one or more impulsive seismic sources or one or more marine vibration seismic sources.

Figure 14:
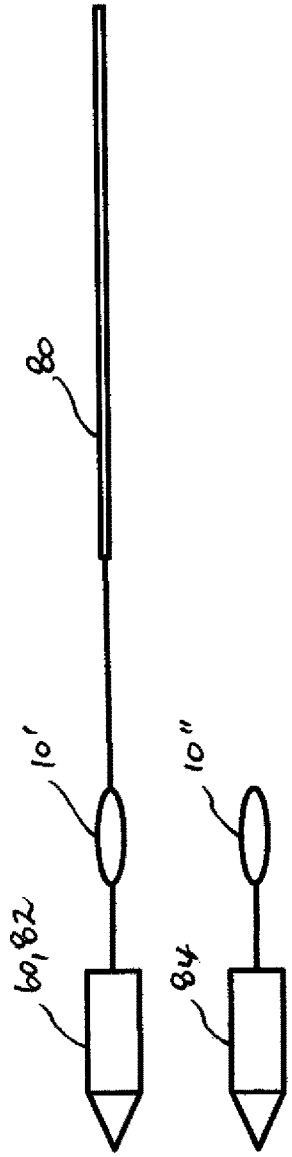
FIG. 14 illustrates at least two magneto-hydrodynamic seismic sources which are synchronised to achieve a wide-azimuth acquisition; and, FIG. 15 illustrates at least two magneto-hydrodynamic seismic sources being used with two streamers.

FIG. 14 shows an embodiment comprising at least two magneto-hydrodynamic seismic sources (10) which are synchronised to achieve a wide-azimuth acquisition. In the embodiment illustrated in FIG. 14, one of the two magneto-hydrodynamic seismic sources (10') is generating pressure waves from the first vessel (82) and the other of the two magneto-hydrodynamic seismic sources (10″) is generating pressure waves from the second vessel (84). The use of a second magneto-hydrodynamic seismic source is advantageous as it creates pressure waves that reinforce subsurface features or cancel out noise and other spurious signals. Additional magneto-hydrodynamic seismic sources can be used to generate pressure waves from a variety of directions and their use can generate broadband information of subsurface formations that would not be detectable if only one magneto-hydrodynamic seismic source is used. Advantageously, the second vessel may be a smaller and cheaper vessel to hire than a marine seismic survey vessel that is capable of towing a streamer, so the costs can be contained and additional benefits can be derived at the expense of longer and more complicated signal processing.

Figure 15:
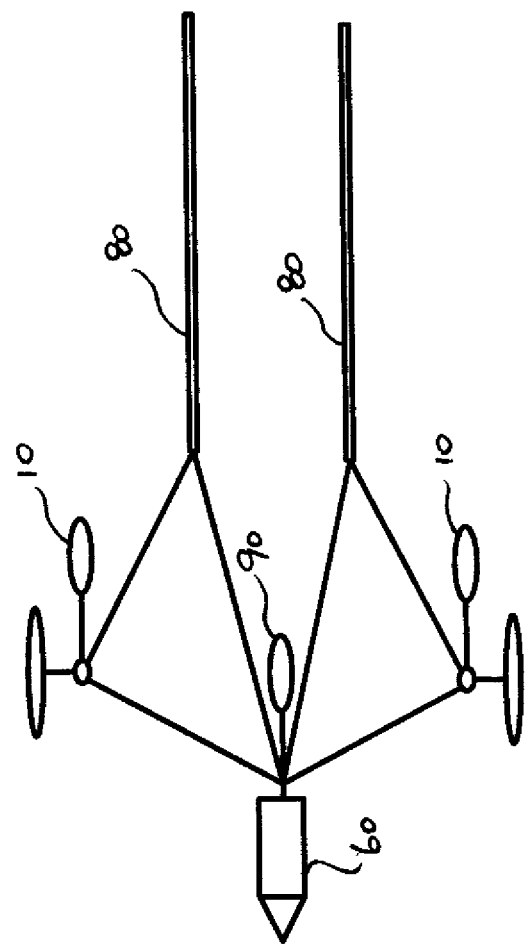

The streamer (80) may be one of a plurality of streamers as illustrated in FIG. 15 which illustrates a plurality of magneto-hydrodynamic seismic sources being used with two streamers. In this embodiment, a second seismic source (90) is included along with the plurality of magneto-hydrodynamic seismic sources (10) to augment the signals generated by one or more impulsive seismic sources or one or more marine vibration seismic sources. In this embodiment, the second seismic source is an impulsive seismic source or a marine vibration seismic source.

FIGS. 16 and 17 illustrate an alternative embodiment of the magneto-hydrodynamic seismic source of the present invention, for which like reference numerals refer to like parts. In this embodiment, the fluid flow channel (18) is one of a plurality of fluid flow channels, each fluid flow channel having a first end (14) and a second end (16). In this embodiment, the casing (12) is cylindrical and each of the fluid flow channels has a longitudinal axis (17) that runs parallel to the central longitudinal axis (19) of the casing (12). However, in this embodiment, the longitudinal axis (17) of each fluid flow channel is parallel to and radially offset from the central longitudinal axis (19) of the casing (12) so that the plurality of flow fluid channels is evenly spaced around the circumference of the casing. In the embodiment illustrated in FIG. 17, the plurality of electromagnets (20) is provided in the form of a plurality of magnet segments (102), preferably toroidal magnet segments, arranged around the circumference of the casing (12) to generate a uniform circular magnetic field in the direction generally designated by the arrow labelled with the reference label 'H' in FIG. 17. As can be seen from FIG. 17, the induced magnetic field is at right angles to each of the plurality of fluid flow channels (18).

In the embodiment illustrated in FIG. 16 and FIG. 17, there is a corresponding number of fluid flow channels (18) and toroidal coil magnet segments (102), with four of each being illustrated in FIG. 16 and FIG. 17 for illustrative purposes only. The plurality of electromagnets comprises four toroidal coil magnet segments designated by the reference numerals 102a, 102b, 102c and 102d which are evenly spaced apart around the circumference of the casing (12). The plurality of fluid flow channels comprises four fluid flow channels designated by the reference numerals 104a, 104b, 104c and 104d. It is to be understood that any number of toroidal coil magnet segments can be used, with four being shown in FIG. 16 and FIG. 17 for illustrative purposes only. In this embodiment, each fluid flow channel is provided with a first electrode (130) positioned on a first side (132) of the fluid flow channel, the first electrode being positioned opposite a second electrode (134) that is positioned within the fluid flow channel on a second opposing side (136) of the fluid flow channel. Referring to FIG. 17, the fluid flow channel designated with the reference numeral (104a) is provided with a first electrode designated by reference numeral (130a) and a second electrode designated by reference numeral (134a). In an analogous manner, the fluid flow channel designated with the reference numeral (104b) is provided with a first electrode designated by reference numeral (130b) and a second electrode designated by reference numeral (134b). In an analogous manner, the fluid flow channel designated with the reference numeral (104c) is provided with a first electrode designated by reference numeral (130c) and a second electrode designated by reference numeral (134c). In an analogous manner, the fluid flow channel designated with the reference numeral (104d) is provided with a first electrode designated by reference numeral (130d) and a second electrode designated by reference numeral (134d).

In use, one or more power sources (138) in electrical communication with each of the first and second electrodes is actuated to apply an electrical current across the first and second electrodes to generate a controlled electric field extending from each first electrode (130) towards each second electrode (134) in the direction generally designated by the arrow labelled with the reference label 'E' in FIG. 17 which is at right angles to the magnetic field 'H'. The interaction of the fixed magnetic field and the variable electrical field generates the Lorenz force that acts on the conductive seawater present within each fluid flow channel (104a, 104b, 104c and 104d). Using the magneto-hydrodynamic source of this embodiment of the present invention, an inflow of seawater (40) is caused to enter the first end (14) of each fluid flow channel (104a, 104b, 104c, and 104d) with a corresponding outflow of seawater (42) in the form of a seismic signal being produced from the second end (16) of each fluid flow channel (18, 104a, 104b, 104c, and 104d). The Lorentz force applied to the inflow and outflow (40 and 42, respectively) varies in proportion to the continuously varying electrical field generated across the first and second electrodes by the power supply.

Figure 18:
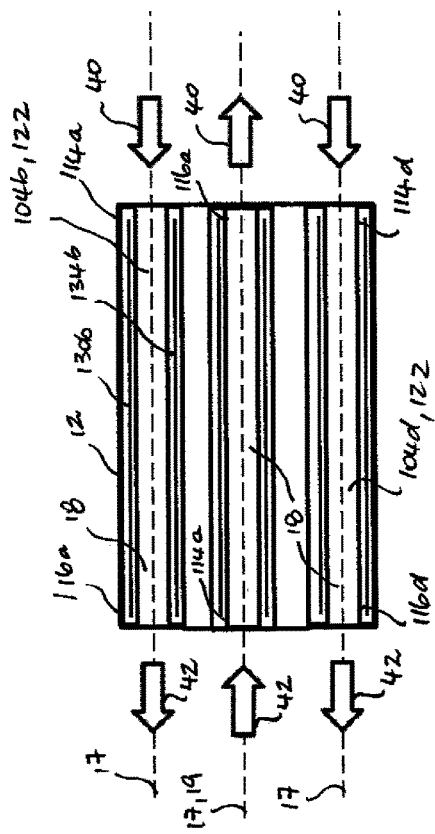
FIG. 18 illustrates a side cross-sectional view of an embodiment of the magneto-hydrodynamic source showing a corresponding number of fluid flow channels and a plurality of toroidal coil magnet segments evenly spaced apart around the circumference of the casing with the power supply controlled to cause the inflow of seawater in opposing directions through each subset of the plurality of flow channels.
Figure 19:
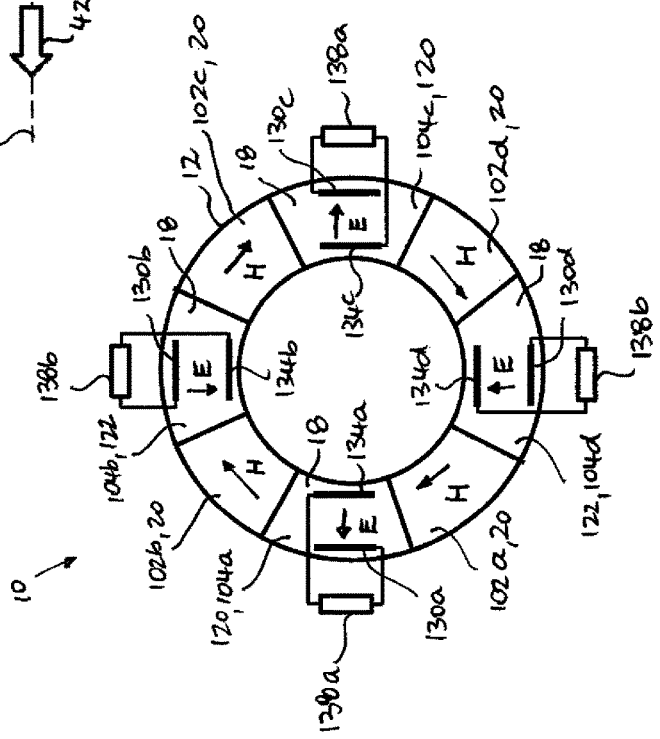
FIG. 19 illustrates an end cross-sectional view of the embodiment illustrated in FIG. 16.

In the embodiment illustrated in FIG. 17, the one or more power sources (138) is configured whereby the inflow and outflow of seawater through each of the plurality of fluid flow channels occurs in the same direction. In an alternative embodiment now described with reference to FIGS. 18 and 19, the one or more power sources (138) can be configured whereby the effective first end (14) and second (16) of a first subset (120) of fluid flow channels within the plurality of fluid flow channels can be reversed relative to a second subset (122) of fluid flow channels within the plurality of fluid flow channels. Referring to FIGS. 18 and 19, the first subset (120) comprises the fluid flow channels (104a) and (104c) and the second subset (122) comprises fluid flow channel (104b) and (104d). In this embodiment, the electric field extending from a first subset of first electrodes (130a and 130c, in this example) towards a corresponding first subset of second electrodes (134a and 134c) is controlled using a first power source (138a) to generate a Lorenz force that acts on the conductive seawater present within the first subset of fluid flow channels (120) such that the seawater enters the first end (114a) of fluid flow channel (104a) and exits at the second end (116a) of fluid flow channel (104a), whilst seawater enters the first end (114c) of flow channel (104c) and exits at the second end (116c) of fluid flow channel (104c). At the same time, the electric field extending from a second subset of first electrodes (130b and 130d, in this example) towards a corresponding second subset of second electrodes (134b and 134d) is controlled using a second power source (138b) to generate a Lorenz force that acts on the conductive seawater present within the second subset of fluid flow channels (122) such that the seawater enters the first end (114b) of fluid flow channel (104b) and exits at the second end (116b) of fluid flow channel (104c), whilst seawater enters the first end (114d) of flow channel (104d) and exits at the second end (116d) of fluid flow channel (104d). As can best be seen in FIG. 18, the direction of flow of seawater along the first subset of fluid flow channels is reversed compared with the direction of flow of seawater along the second subset of fluid flow channels. Advantageously, this embodiment can be used to neutralise the reaction force of the source relative to the marine environment in which it operates.

Figure 21:
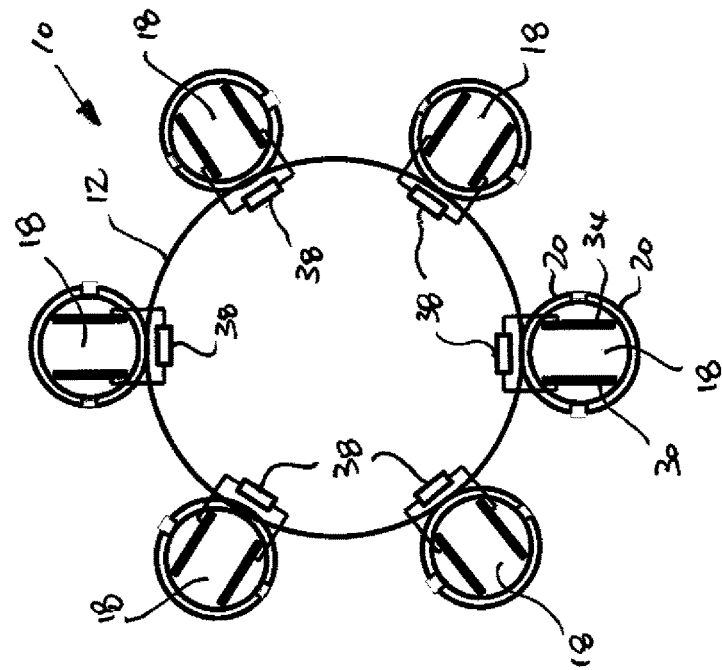
Figure 20:
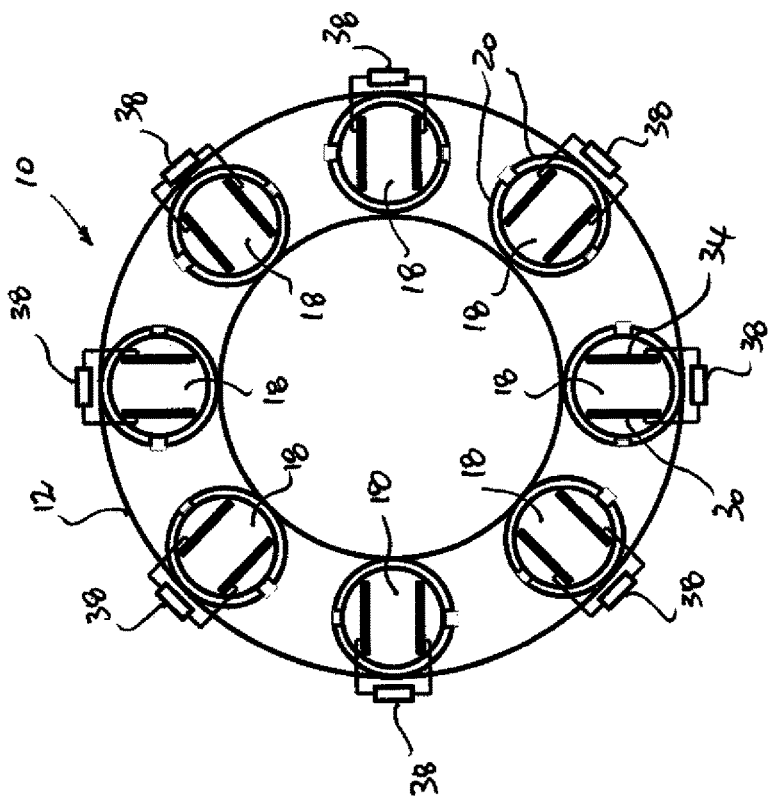
FIG. 20 illustrates an end cross-section view of an embodiment with a plurality of fluid flow channels, each with a pair of saddle-type electromagnets, the plurality of fluid flow channels arranged evenly spaced apart within the circumference of the casing; and, FIG. 21 illustrates an end cross-section view of an embodiment with a plurality of fluid flow channels, each with a pair of saddle-type electromagnets, the plurality of fluid flow channels arranged evenly spaced apart around the outside of the circumference of the casing.

FIGS. 20 and 21 illustrate yet another alternative embodiment of the magneto-hydrodynamic seismic source of the present invention, for which like reference numerals refer to like parts. These embodiments illustrate the use of a plurality of fluid flow channels (18) arranged at radially evenly spaced intervals around the circumference of the casing (12). The plurality of fluid flow channels (18) may be provided within the casing (12) as shown in FIG. 20, with eight fluid flow channels illustrated by way of example only. Alternatively, the plurality of fluid flow channels may be provided outside the casing as shown in FIG. 21, with six fluid flow channels illustrated by way of example only. In these embodiments, each fluid flow channel being provided with a plurality of superconducting magnets comprising a first saddle-type superconducting electromagnet (22) arranged along a first side (24) of the channel and a second paired saddle-type superconducting electromagnet (26) arranged on a second opposing side (28) of the channel. First and second electrodes (30 and 34, respectively) are positioned within each channel at right angles to the magnetic field induced by each pair of superconducting electromagnets (22). In use, a power source (38) in electrical communication with the first and second electrodes of each channel is actuated to apply a continuously varying electrical current across the first and second electrodes to generate a controlled electric field extending from each of the first electrodes towards each of the second electrodes at right angles to the magnetic field to cause an inflow of seawater with a corresponding outflow of seawater in the form of a seismic signal in the manner described above. Advantageously, using either of the embodiments illustrated in FIG. 20 or FIG. 21, the electrical current being generated across each set of first and second electrodes can be tuned to adjust the inflow and outflow of seawater through each of the plurality of channels so as to counteract an overall drag force experienced by the magneto-hydrodynamic source when towed behind a marine vessel in use. Alternatively, the electrical current being generated across each set of first and second electrodes can be tuned to adjust the inflow and outflow of seawater through each of the plurality of channels so that the magneto-hydrodynamic source can be self-propelling.

Although only a few embodiments of this invention have been described in detail above, those skilled in the art will readily appreciate that many modifications are possible in the embodiments without materially departing from the novel teachings and advantages of this invention. By way of example, the plurality of electromagnets is provided in the form of a plurality of solenoidal magnets arranged perpendicular to each other along the central longitudinal axis of the casing to generate a uniform circular magnetic field. By way of further example, the marine survey vessel may be caused to traverse a non-linear sail line such as a curved sail line, a sinusoidal sail line or a circular sail line, during the marine seismic survey. Accordingly, all such modifications are intended to be included within the scope of this invention.

It will be clearly understood that, although a number of prior art publications are referred to herein, this reference does not constitute an admission that any of these documents forms part of the common general knowledge in the art, in Australia or in any other country. In the statement of invention and description of the invention which follow, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A magneto-hydrodynamic seismic source comprising:
a casing having a central longitudinal axis;
a fluid flow channel having a first end and a second end and a longitudinal axis extending from the first end of the fluid flow channel to the second end of the fluid flow channel;
a plurality of electromagnets arranged along the channel for generating a uniform magnetic field at right angles to the central longitudinal axis of the channel;
a first electrode positioned on a first side of the fluid flow channel, the first electrode being positioned opposite a second electrode that is positioned on a second opposing side of the fluid flow channel; and
a controllable power source in electrical communication with the first electrode and the second electrode for generating a continuously varying electric field between the first electrode and second electrodes to generate a continuously varying inflow of seawater into the first end of the fluid flow channel with a corresponding continuously varying outflow of seawater in the form of a seismic signal being produced from the second end of the fluid flow channel;
wherein each of the electromagnets has a polarity and the polarities of the plurality of electromagnets arranged along the casing are paired and opposed such that a first inflow of seawater enters at the first end of the fluid flow channel, a second inflow of water enters at the second end of the fluid flow channel, the fluid flow channel includes a discharge port for producing an outflow of seawater in the form of a seismic signal, and the discharge port is positioned a discharge location intermediate between the first end of the fluid flow channel and the second end of the fluid flow channel.

2. The magneto-hydrodynamic seismic source of claim 1 wherein the seismic signal has a frequency less than 5 Hz.

3. The magneto-hydrodynamic seismic source of claim 1 wherein the plurality of electromagnets includes a first electromagnet arranged along a first side of the channel and a second paired electromagnet arranged on a second opposing side of the channel, and each of the plurality of electromagnets is a saddle-type electromagnet.

4. The magneto-hydrodynamic seismic source of claim 1 wherein each of the plurality of electromagnets is a superconducting electromagnet.

5. The magneto-hydrodynamic seismic source of claim 1 wherein the discharge location is centrally located between the first end of the fluid flow channel and second end of the fluid flow channel.

6. The magneto-hydrodynamic seismic source of claim 1 wherein the discharge port takes the form of a plurality of spaced apart apertures such that the outflow of seawater is directed radially outwardly from the fluid flow channel.

7. The magneto-hydrodynamic seismic source of claim 1 wherein the casing has a central longitudinal axis and the longitudinal axis of the fluid flow channel is parallel to or coaxial with the central longitudinal axis of the casing.

8. The magneto-hydrodynamic seismic source of claim 1 wherein the seismic signal has a broadband waveform.

9. The magneto-hydrodynamic seismic source of claim 1 wherein the seismic signal has a variable waveform.

10. The magneto-hydrodynamic seismic source of claim 1 wherein the seismic signal has a waveform in the form of a spike, a narrow band signal, a coded wave form, or a monochromatic waveform.

11. The magneto-hydrodynamic seismic source of claim 1 wherein the magneto-hydrodynamic seismic source is one of a plurality of seismic sources arranged in an array.

12. The magneto-hydrodynamic seismic source of claim 11 wherein the array is a phased array.

13. The magneto-hydrodynamic seismic source of claim 11 wherein at least one of the seismic sources in the array is a magneto-hydrodynamic seismic source and at least one of the seismic sources in the array is an impulsive source.

14. The magneto-hydrodynamic seismic source of claim 11 wherein at least one of the seismic sources in the array is a magneto-hydrodynamic seismic source and at least one of the seismic sources in the array is a marine vibration seismic source.

15. The magneto-hydrodynamic seismic source of claim 1 wherein the fluid flow channel is one of a plurality of fluid flow channels, each fluid flow channel having a first end and a second end and a set of first and second electrodes.

16. The magneto-hydrodynamic seismic source of claim 15 wherein the casing has a central longitudinal axis and the longitudinal axis of each fluid flow channel is parallel to and radially offset from a central longitudinal axis of the casing so that the plurality of flow fluid channels is evenly spaced around the circumference of the casing.

17. The magneto-hydrodynamic seismic source of claim 1 wherein the plurality of electromagnets is provided in the form of a plurality of electromagnet segments.

18. The magneto-hydrodynamic seismic source of claim 17 wherein there is a corresponding number of the plurality of fluid flow channels and the plurality of electromagnet segments.

19. The magneto-hydrodynamic seismic source of claim 1 wherein the plurality of electromagnet segments is a plurality of toroidal or solenoidal magnet segments, arranged around the circumference of the casing.

20. The magneto-hydrodynamic seismic source of claim 1 wherein the casing is cylindrical and has a circumference, and, the plurality of fluid flow channels is arranged at radially evenly spaced intervals around the outside of the circumference of the casing.

21. The magneto-hydrodynamic seismic source of claim 15 wherein the plurality of fluid flow channels comprises a first subset of fluid flow channels and second subset of flow fluid channels and the power source is configured so that the direction of the inflow into the first subset of fluid flow channels is reversed relative to the direction of the inflow of seawater into the second subset of fluid flow channels.

22. The magneto-hydrodynamic seismic source of claim 15 wherein the electrical field being generated across each set of first and second electrodes is tuned to adjust the inflow and outflow of seawater through each of the plurality of channels to counteract an overall drag force experienced by the magneto-hydrodynamic source when towed behind a marine vessel in use.

23. The magneto-hydrodynamic seismic source of claim 15 wherein the electrical field being generated across each set of first and second electrodes is tuned to adjust the inflow and outflow of seawater through each of the plurality of channels so that the magneto-hydrodynamic source can be self-propelling.

24. The magneto-hydrodynamic seismic source of claim 1 wherein the power source is one of a plurality of power sources.

25. A method of acquiring marine seismic data comprising:
actuating a magneto-hydrodynamic seismic source to generate a seismic signal, a portion of said seismic signal being reflected at an interface associated with a subsea geological feature in the form of a reflected seismic signal; and
collecting the reflected seismic signal with a seismic signal receiver to generate a set of survey data,
wherein the magneto-hydrodynamic seismic source comprises:
a casing having a central longitudinal axis;
a fluid flow channel having a first end and a second end and a longitudinal axis extending from the first end of the fluid flow channel to the second end of the fluid flow channel;
a plurality of electromagnets arranged along the channel for generating a uniform magnetic field at right angles to the central longitudinal axis of the channel;
a first electrode positioned on a first side of the fluid flow channel, the first electrode being positioned opposite a second electrode that is positioned on a second opposing side of the fluid flow channel; and
a controllable power source in electrical communication with the first electrode and the second electrode for generating a continuously varying electric field between the first electrode and second electrodes to generate a continuously varying inflow of seawater into the first end of the fluid flow channel with a corresponding continuously varying outflow of seawater in the form of a seismic signal being produced from the second end of the fluid flow channel;
wherein each electromagnet has a polarity and the polarities of the plurality of electromagnets arranged along the casing are paired and opposed such that a first inflow of seawater enters at the first end of the fluid flow channel, a second inflow of water enters at the second end of the fluid flow channel, the fluid flow channel includes a discharge port for producing an outflow of seawater in the form of a seismic signal, and the discharge port is positioned a discharge location intermediate between the first end of the fluid flow channel and the second end of the fluid flow channel.

26. The method of claim 25 wherein the seismic signal has a frequency less than 5 Hz.

27. The method of claim 25 wherein the plurality of electromagnets includes a first electromagnet arranged along a first side of the channel and a second paired electromagnet arranged on a second opposing side of the channel, and each of the plurality of electromagnets is a saddle-type electromagnet.

28. The method of claim 25 wherein each of the plurality of electromagnets is a superconducting electromagnet.

29. The method of claim 25 wherein the discharge location is centrally located between the first end of the fluid flow channel and second end of the fluid flow channel.

30. The method of claim 25 wherein the discharge port takes the form of a plurality of spaced apart apertures such that the outflow of seawater is directed radially outwardly from the fluid flow channel.

31. The method of claim 25 wherein the casing has a central longitudinal axis and the longitudinal axis of the fluid flow channel is parallel to or coaxial with the central longitudinal axis of the casing.

32. The method of claim 25 wherein the seismic signal has a broadband waveform.

33. The method of claim 25 wherein the seismic signal has a variable waveform.

34. The method of claim 25 wherein the seismic signal has a waveform in the form of a spike, a narrow band signal, a coded wave form, or a monochromatic waveform.

35. The method of claim 25 wherein the magneto-hydrodynamic seismic source is one of a plurality of seismic sources arranged in an array.

36. The method of claim 35 wherein the array is a phased array.

37. The method of claim 35 wherein at least one of the seismic sources in the array is a magneto-hydrodynamic seismic source and at least one of the seismic sources in the array is an impulsive source.

38. The method of claim 35 wherein at least one of the seismic sources in the array is a magneto-hydrodynamic seismic source and at least one of the seismic sources in the array is a marine vibration seismic source.

39. The method of claim 25 wherein the fluid flow channel is one of a plurality of fluid flow channels, each fluid flow channel having a first end and a second end and a set of first and second electrodes.

40. The method of claim 39 wherein the casing has a central longitudinal axis and the longitudinal axis of each fluid flow channel is parallel to and radially offset from a central longitudinal axis of the casing so that the plurality of flow fluid channels is evenly spaced around the circumference of the casing.

41. The method of claim 25 wherein the plurality of electromagnets is provided in the form of a plurality of electromagnet segments.

42. The method of claim 41 wherein there is a corresponding number of the plurality of fluid flow channels and the plurality of electromagnet segments.

43. The method of claim 41 wherein the plurality of electromagnet segments is a plurality of toroidal or solenoidal magnet segments, arranged around the circumference of the casing.

44. The method of claim 39 wherein the casing is cylindrical and has a circumference, and, the plurality of fluid flow channels is arranged at radially evenly spaced intervals around the outside of the circumference of the casing.

45. The method of claim 39 wherein the plurality of fluid flow channels comprises a first subset of fluid flow channels and second subset of flow fluid channels and the power source is configured so that the direction of the inflow into the first subset of fluid flow channels is reversed relative to the direction of the inflow of seawater into the second subset of fluid flow channels.

46. The method of claim 39 the electrical field being generated across each set of first and second electrodes is tuned to adjust the inflow and outflow of seawater through each of the plurality of channels to counteract an overall drag force experienced by the magneto-hydrodynamic source when towed behind a marine vessel in use.

47. The method of claim 39 wherein the electrical field being generated across each set of first and second electrodes is tuned to adjust the inflow and outflow of seawater through each of the plurality of channels so that the magneto-hydrodynamic source can be self-propelling.

48. The method of claim 25 wherein the power source is one of a plurality of power sources.

\* \* \* \* \*